(12) United States Patent
Sitaram et al.

(10) Patent No.: US 10,236,965 B1
(45) Date of Patent: Mar. 19, 2019

(54) DYNAMIC MULTI-ANTENNA COMMUNICATION

(71) Applicant: Sprint Spectrum LP, Overland Park, KS (US)

(72) Inventors: Krishna Sitaram, Chantilly, VA (US); Chunmei Liu, Great Falls, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 231 days.

(21) Appl. No.: 15/284,687

(22) Filed: Oct. 4, 2016

(51) Int. Cl.
| | | |
|---|---|---|
| *H04B 7/06* | (2006.01) | |
| *H01Q 21/00* | (2006.01) | |
| *H04L 5/00* | (2006.01) | |
| *H01Q 1/24* | (2006.01) | |

(52) U.S. Cl.
CPC .......... *H04B 7/0689* (2013.01); *H01Q 21/00* (2013.01); *H04B 7/0604* (2013.01); *H04B 7/0697* (2013.01); *H04L 5/006* (2013.01); *H01Q 1/246* (2013.01); *H04B 7/0608* (2013.01)

(58) Field of Classification Search
CPC ........ H04B 7/06–7/0697; H01Q 21/00–21/30
See application file for complete search history.

(56) References Cited

U.S. PATENT DOCUMENTS

| | | | |
|---|---|---|---|
| 7,675,474 B2 | 3/2010 | Shtrom et al. | |
| 7,965,785 B2* | 6/2011 | Li | H04B 7/026 375/267 |
| 9,806,785 B2* | 10/2017 | Ma | H04B 7/0697 |
| 2004/0095278 A1* | 5/2004 | Kanemoto | H04B 7/10 343/700 MS |
| 2007/0230639 A1* | 10/2007 | Stirling-Gallacher | H04B 7/0408 375/347 |
| 2008/0188192 A1* | 8/2008 | Chae | H04B 7/063 455/129 |
| 2010/0157925 A1* | 6/2010 | Francos | H04B 7/0689 370/329 |
| 2010/0290553 A1 | 11/2010 | Li et al. | |
| 2012/0188881 A1* | 7/2012 | Ma | H04B 7/0697 370/252 |
| 2014/0003240 A1* | 1/2014 | Chen | H04W 28/08 370/235 |
| 2014/0098689 A1* | 4/2014 | Lee | H04B 7/0469 370/252 |
| 2014/0145896 A1 | 5/2014 | Bi et al. | |
| 2015/0003551 A1* | 1/2015 | Kim | H04B 7/0602 375/267 |
| 2015/0105025 A1* | 4/2015 | Zhang | H01Q 3/26 455/63.4 |
| 2015/0131720 A1* | 5/2015 | Luo | H04L 12/189 375/240.12 |

(Continued)

*Primary Examiner* — Duc M Nguyen

(57) ABSTRACT

According to exemplary embodiments described herein, communicating via a plurality of antennae includes transmitting different data streams from each of a first antenna and a second antenna in a first transmission mode, and transmitting identical data streams from a third antenna and one of the first and second antennae in a second transmission mode. The first and second antennae are horizontally stacked relative to each other and the third antenna is vertically stacked relative to both the first and second antennae.

18 Claims, 5 Drawing Sheets

(56) References Cited

U.S. PATENT DOCUMENTS

| | | | |
|---|---|---|---|
| 2015/0253420 A1 | 9/2015 | Alland | |
| 2015/0288497 A1* | 10/2015 | Li | H04B 7/0413 |
| | | | 370/329 |
| 2015/0304001 A1* | 10/2015 | Tomeba | H04B 7/04 |
| | | | 375/267 |
| 2016/0050003 A1* | 2/2016 | Ko | H04B 7/0469 |
| | | | 370/329 |
| 2016/0056876 A1* | 2/2016 | Tanaka | H04W 48/20 |
| | | | 370/329 |
| 2016/0191133 A1* | 6/2016 | Noh | H04B 7/0697 |
| | | | 370/329 |
| 2016/0191273 A1* | 6/2016 | Nagata | H04W 16/28 |
| | | | 370/252 |

* cited by examiner

DYNAMIC MULTI-ANTENNA COMMUNICATION

TECHNICAL BACKGROUND

As wireless networks evolve and grow, there are ongoing challenges in providing high-quality service to increasing numbers of wireless devices in various coverage areas of a wireless network. Multiple-input and multiple-output (MIMO) is used to multiply the capacity of a radio interface using multiple transmit and receive antennas. Different types of MIMO transmission modes may be used to communicate with the wireless devices attached to an access node. One such type of transmission mode utilizes transmit diversity, which includes sending redundant (i.e. identical) information across plural transmit antennas to improve the quality in the received signal. This transmission mode exploits the diversity of possible transmission paths between a transmitter and a receiver, thereby improving reliability and decreasing the probability of error. Another transmission mode uses spatial multiplexing, which includes transmitting an independent data stream on each antenna for effectively sending multiple data streams in parallel. This mode enables transmission of data generally at a higher rate, but typically less reliably than with transmit diversity. Transmit diversity is well suited for wireless devices (and applications running thereon) requiring extremely high reliability such as at an edge of a coverage area, whereas wireless devices (and applications running thereon) that can smoothly handle losses or are close to an access node benefit from spatial multiplexing. However, existing access nodes are limited in their ability to handle both transmission modes to their highest potential, particularly when the arrangement and spacing of physical antennae are not optimized.

Overview

Exemplary embodiments described herein include systems, methods, and processing nodes for communicating via a plurality of antennae. In one exemplary embodiment, a method for communicating via a plurality of antennae includes transmitting different data streams from each of a first antenna and a second antenna in a first transmission mode, and transmitting identical data streams from a third antenna and one of the first and second antennae in a second transmission mode. The first and second antennae are horizontally stacked relative to each other and the third antenna is vertically stacked relative to both the first and second antennae.

In another exemplary embodiment, a system for communicating via a plurality of antennae includes a first antenna, a second antenna positioned horizontally adjacent the first antenna, a third antenna positioned vertically adjacent both the first and second antennae, and a processing node communicatively coupled to each of the first, second, and third antennae. The processing node is configured to determine a transmission mode from among a spatial multiplexing mode using the first and second antennae and a transmit diversity mode using the third antenna and one of the first and second antennae.

In yet another exemplary embodiment, a processing node for communicating via a plurality of antennae is configured to perform operations comprising utilizing a first pair of antennae in a spatial multiplexing transmission mode, wherein the first pair of antennae is horizontally-stacked and, upon a signal condition meeting a threshold, utilizing a second pair of antennae in a transmit diversity transmission mode, wherein the second pair of antennae is vertically-stacked. Both first and second pairs have one antenna in common.

DETAILED DESCRIPTION

Figure 1:
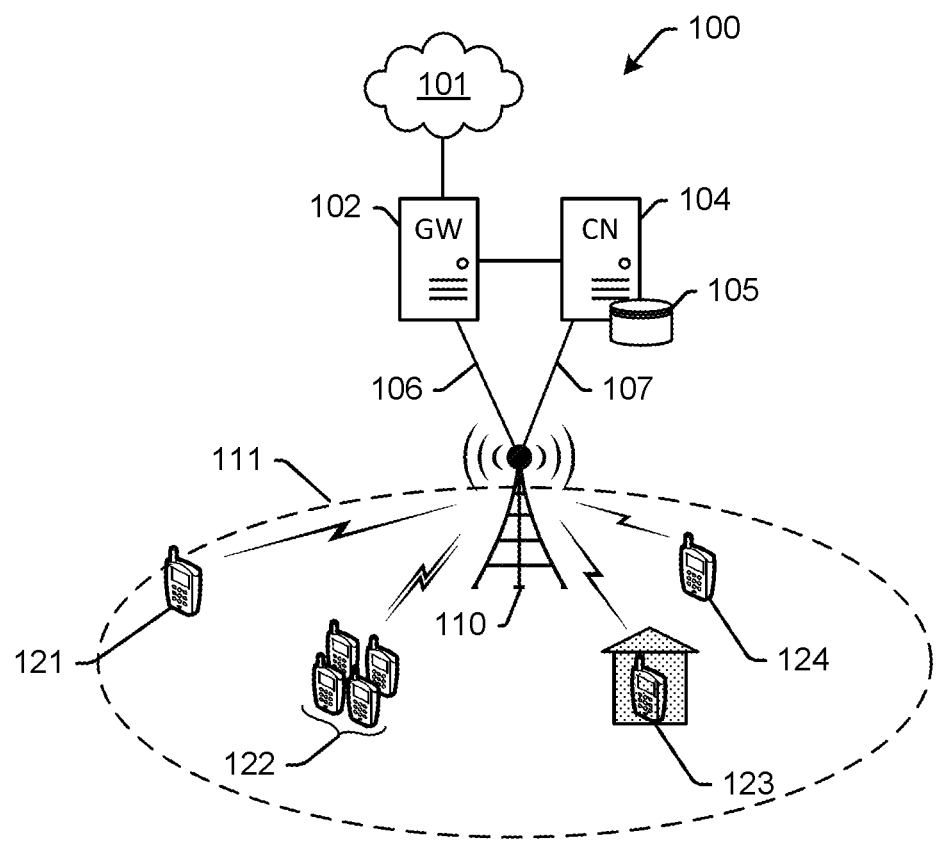
FIG. 1 depicts an exemplary system for dynamic multi-antenna communication.

In embodiments disclosed herein, a plurality of antennae of an access node can be configured in different pairs, enabling selection of either a spatial multiplexing transmission mode or a transmit diversity transmission mode. The access node may comprise at least three physical antennae, i.e. a first antenna, a second antenna, and a third antenna. The at least three physical antennae are arranged such that a first pair of antennae, i.e. the first and second antennae, are horizontally-stacked, and a second pair of antennae, i.e. the third antennae and one of the first and second antennae, are vertically-stacked. In other words, the first antenna is positioned horizontally adjacent the second antenna, and the third antenna is positioned vertically adjacent both the first and second antennae. The antennae may be positioned such that a horizontal distance between the first and second antennae is less than or equal to half of an average wavelength of signals transmitted by either of the first and second antennae, thereby improving the gains provided by the spatial multiplexing transmission mode. Additionally, the vertical separation between the third antennae and each of the first and second antennae is sufficiently large to provide gains from the transmit diversity transmission mode. Moreover, the at least three antennae may be enclosed within a single antenna pole, and at least one of the first, second, and third antennae can further comprise a dual-band or tri-band antenna.

The configuration of each pair of antennae in each respective transmission mode may be performed by configuring the horizontally-stacked pair (i.e. first and second antennae) to transmit different data streams from each antenna, i.e. a spatial multiplexing transmission mode. The vertically-stacked pair may be configured to transmit identical data streams from the third antenna and one of the first and second antennae, i.e. a transmit diversity transmission mode. The antenna pairs may be configured (and reconfigured) by mapping logical antenna ports to each of the at least three physical antennae. For example, in the spatial multiplexing transmission mode, a first antenna port is mapped to the first physical antenna in the first pair, and a second antenna port is mapped to the second physical antenna in the first pair. Similarly, in the transmit diversity transmission mode, the first antenna port may continue to be mapped to the first physical antenna, while the second antenna port may be remapped to the third physical antenna, thereby forming the second pair of antenna comprising the first and third physical antennae. Other configurations of mapping ports to physical antennae are possible, so long as the first and second pairs are used to respectively communicate using the first and second transmission modes.

The access node (or any other network element) may be further configured to determine the transmission mode from among the two transmission modes described herein based on a signal condition. The signal condition may be related to a sector served by one or more of the first, second, and third antennae. For example, the signal condition may be obtained from wireless devices accessing network services from the access node via one or more of the three antennae. The signal condition can comprise a signal to interference plus noise ratio (SINR), or a number or rate of hybrid automatic repeat request (HARQ) retransmissions, or any other metric that provides an indication of coverage requirements of wireless devices at various locations around the network. For example, at certain times of the day, there may be an increased number of wireless devices around an edge of a coverage area, as determined by one or more signal conditions. It may be determined that a transmit diversity, i.e. identical data streams from different antennae in the pair, provides better coverage for these remote wireless devices. In another scenario, a dense cluster of wireless devices may be present in a small area nearby the access node (and antennae thereof). Spatial multiplexing, i.e. different data streams from different antennae in the pair, can provide more efficient transmission in this scenario. The signal condition (i.e. SINR or HARQ rate) can be compared with one or more thresholds in order to trigger a determination of which transmission mode to implement. Further, the signal condition can be an average or other statistical determination based on a majority or all wireless devices, or individual measurements.

These and additional operations are further described with respect to the embodiments depicted in FIGS. 1-5 below.

FIG. 1 depicts an exemplary system 100 for dynamic multi-antenna communication. System 100 comprises a communication network 101, gateway 102, controller node 104, access node 110, and end-user wireless devices 121, 122, 123, 124. Access node 110 is illustrated as having coverage area 111, and end-user wireless devices 121, 122, 123, 124 are located within coverage area 111 and access network services from access node 110 via an air interface deployed by access node 110. The air interface may be deployed via a plurality of antennae coupled to access node 110, as further described in FIG. 2. Wireless device 121 is illustrated as being near a cell edge of coverage area 111, wireless devices 122 comprise a dense cluster of wireless devices that are illustrated as being within a small geographical location within coverage area 111 and close to access node 110, wireless device 123 is illustrated as being located indoors, i.e. within a building that is well within coverage area 111, and wireless device 124 is illustrated as being relatively close to access node 110.

In operation, access node 110 may monitor usage of its air interface, and determine which one out of two transmission modes to utilize. The signal condition may be related to a sector served by one or more antennae coupled to access node 110, and may be reported to access node 110 from one or more of wireless devices 121, 122, 123, 124. The signal condition can comprise a signal to interference plus noise ratio (SINR), or a number or rate of hybrid automatic repeat request (HARQ) retransmissions, or any other metric that provides an indication of coverage requirements of wireless devices at various locations around the network. For example, wireless device 121 at the edge of coverage area 111, and wireless device 123 inside a building, may both suffer from reduced SINR and/or increase HARQ rates. In contrast, cluster of wireless devices 122, and wireless device 124, may have sufficient SINR or low HARQ rates. Based on one or more signal conditions of each of wireless devices 121-124, it may be determined that either a transmit diversity transmission mode or a spatial multiplexing transmission mode would yield the best average conditions. For example, identical data streams from different antennae (i.e., transmit diversity) provides better coverage for the remote/enclosed wireless devices 121, 123, while different data streams from different antennae (i.e., spatial multiplexing) provides more efficient coverage for wireless devices 122, 123. Since only one of the two transmission modes may be implemented at one time, an average signal condition (i.e. SINR or HARQ rate) can be compared with one or more thresholds in order to trigger a determination of which transmission mode to implement. The determination may be further based on a predictive signal condition based on, for instance, anticipated signal conditions upon implementing one or both transmission modes, or on actual signal conditions obtained subsequent to implementing one or both transmission modes.

Upon determining a transmission mode, the antennae coupled to access node 110 may be configured (or reconfigured) in pairs, based on the determined transmission mode. For instance, in the spatial multiplexing transmission mode, two antennae that are horizontally-stacked may be configured to transmit different data streams from each antenna. In the transmit diversity transmission mode, two antennae that are vertically-stacked may be configured to transmit identical data streams each antenna. The antenna pairs may be configured (and reconfigured) by mapping logical antenna ports to each of at least three antennae. For example, in the spatial multiplexing transmission mode, a first antenna port is mapped to the first physical antenna in the first pair, and a second antenna port is mapped to the second physical antenna in the first pair. Similarly, in the transmit diversity transmission mode, the first antenna port may continue to be mapped to the first physical antenna, while the second antenna port may be remapped to the third physical antenna, thereby forming the second pair of antenna comprising the first and third physical antennae. Other configurations of mapping antenna ports to physical antennae are possible.

Access node 110 can be any network node configured to provide communication between end-user wireless devices 121, 122, 123, 124 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In an exemplary embodiment, a macrocell access node can have a coverage area 111 in the range of approximately five kilometers to thirty five kilometers and an output power in the tens of watts. In other embodiments, access node 110 can be a small access node including a microcell access node, a picocell access node, a femtocell access node, or the like such as a home NodeB or a home eNodeB device. As further described herein and with reference to FIG. 2, access node 110 can operate using different frequencies or bands of frequencies, by virtue of having multi-band antennae. Moreover, it is noted that while access node 110 is illustrated in FIG. 1, any number of access nodes can be implemented within system 100.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access nodes 110 may communicate with other access nodes (not shown) using a direct link such as an X2 link or similar.

Wireless devices 121, 122, 123, 124 may be any device, system, combination of devices, or other such communication platform capable of communicating wirelessly with access node 110 using one or more frequency bands deployed therefrom. Each of wireless devices 121, 122, 123, 124 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible. One or more of wireless devices 121, 122, 123, 124 may further comprise a relay node for relaying services from access node 110 to other end-user wireless devices. For example, wireless device 123 may be a relay node for relaying network services to other devices within the building in which it is located.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121, 122, 123, 124. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information such as historical trends of signal conditions and associations of signal conditions with wireless devices and transmission modes. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2A:
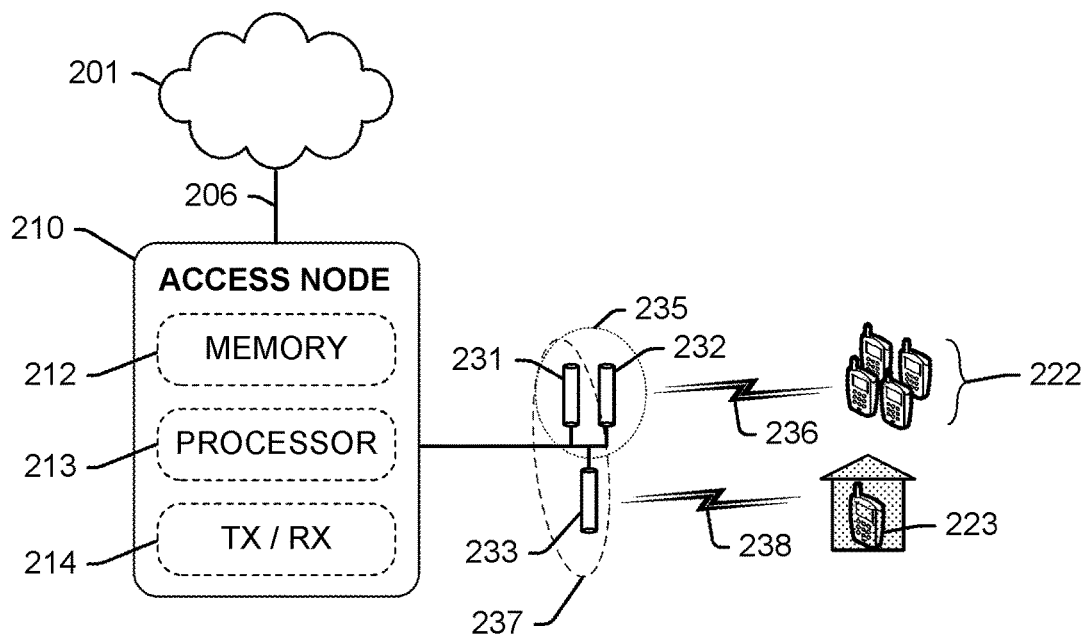
FIGS. 2A-2B depict an exemplary access node for dynamic multi-antenna communication and antennae thereof.
Figure 2B:
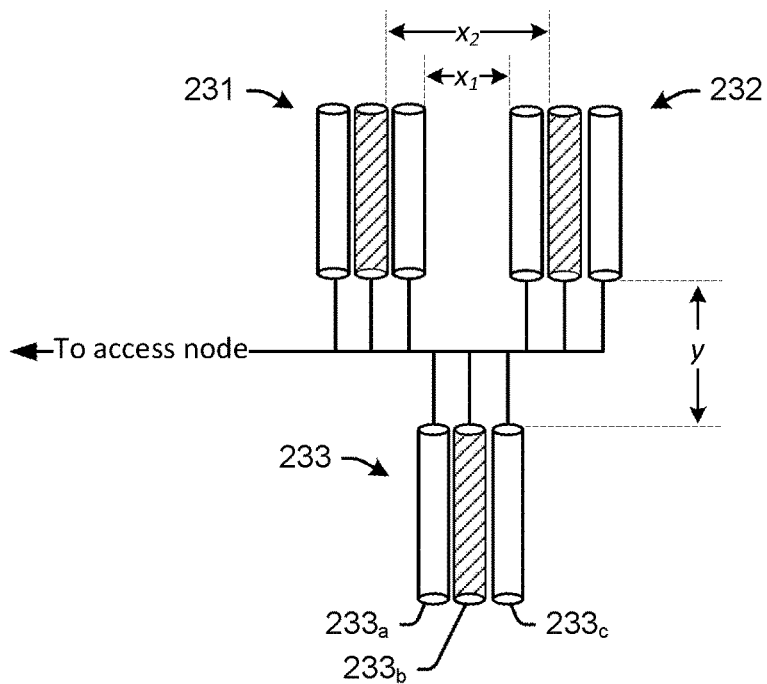

FIGS. 2A-2B depict an exemplary access node for dynamic multi-antenna communication and antennae thereof. With reference to FIG. 2A, access node 210 is configured as an access point for providing network services from network 201 to end-user wireless devices 222, 223 via antennae 231, 232, 233. Access node 210 is illustrated as comprising a memory 212 for storing logical modules that perform operations described herein, a processor 213 for executing the logical modules, and a transceiver 213 for transmitting and receiving signals via antennae 231, 232, 233. Further, access node 210 is communicatively coupled to network 201 via communication interface 206, which may be any wired or wireless link as described above. Although only one transceiver is depicted in access node 210, additional transceivers may be incorporated in order to deploy multiple frequency bands and to facilitate communication across other network nodes that are not shown, such as gateways, controllers, and other access nodes.

In operations described herein, access node 210 may monitor usage of its air interface deployed by one or more of antennae 231, 232, 233, and determine which one out of two transmission modes to utilize. The signal condition may be reported to access node 210 from one or more of wireless devices 222, 223, and can comprise an SINR, HARQ rate, or any other metric of signal quality or strength. Wireless devices 222 may have sufficient SINR or low HARQ rates, and may benefit from a spatial multiplexing transmission mode. Wireless device 223 may be enclosed in a building and have low SINR or high HARQ, and therefore benefit from a transmission diversity transmission mode. Based on one or more signal conditions (or averages thereof) meeting high or low thresholds as further described herein, a transmission mode may be determined, and antennae 231, 232, 233 may be configured as pairs, depending on the transmission mode. For example, in a spatial multiplexing transmission mode, antennae 231 and 232 (i.e., horizontally-stacked antenna pair 235) may be configured to transmit different data streams 236 from each antenna in antenna pair 235. For example, in a transmit diversity transmission mode, antennae 231 and 233 (i.e. vertically-stacked antenna pair 237) may be configured to transmit identical data streams 238 from each antenna. The antenna pairs 235 and 237 may be configured (and reconfigured) by mapping logical antenna ports to each of antennae 231, 232, 233. Further, although antenna pairs 235 and 237 are illustrated in FIG. 2A, any pairing may be used, such as a pairing of antennae 232 and 233 for a transmit diversity transmission mode.

FIG. 2B depicts a detailed view of antennae 231, 232, 233. Each antenna 231, 232, 233 may be a multi-band antenna. For example, each antenna comprises three sub-antennae for communicating with different frequencies or bands. For example, antenna 233 comprises sub-antennae $233_a$, $233_b$, $233_c$. Shaded antenna $233_b$ may communicate using, for instance, an 800 MHz frequency (or band of frequencies around 800 MHz), while solid antennae $233_a$, $233_c$ may communicate using, for instance, a 2.5 GHz frequency (or band of frequencies around 2.5 GHz). Further, the spacing of antennae 231, 232, and 233 is optimized for maximum gains from each transmission mode. For optimal spatial multiplexing using horizontally-stacked antenna pair 231, 232, spacing $x_1$ and $x_2$ may be less than or equal to half of a wavelength used by each sub-antenna of the antenna pair. For example, spacing $x_1$ may be less than half of a wavelength of the 2.5 GHz frequency band, and spacing $x_2$ may be less than half of a wavelength of the 800 MHz frequency band. Further, distance y between antenna 233 and either antennae 231 or 232 (i.e. a vertically-stacked antenna pair) is optimized for maximum gains using transmit diversity.

In some exemplary embodiments, sub-antennae $233_a$, $233_b$, $233_c$ use the same band class across all three antennae 231, 232, 233. Alternatively or in addition, one sub-antenna of each antenna 231, 232, 233 may use an 800 MHz frequency band while the other two may use a 2.5 GHz frequency band. In such an embodiment, utilizing all three sub-antennae may be enabled by carrier aggregation and other techniques. Further, although only three sub-antennae $233_a$, $233_b$, $233_c$ are depicted in FIG. 2B, each multi-band antennae 231, 232, 233 may comprise any number of sub-antennae, with the possibility of various configurations of band classes other than the ones described above.

Figure 3:
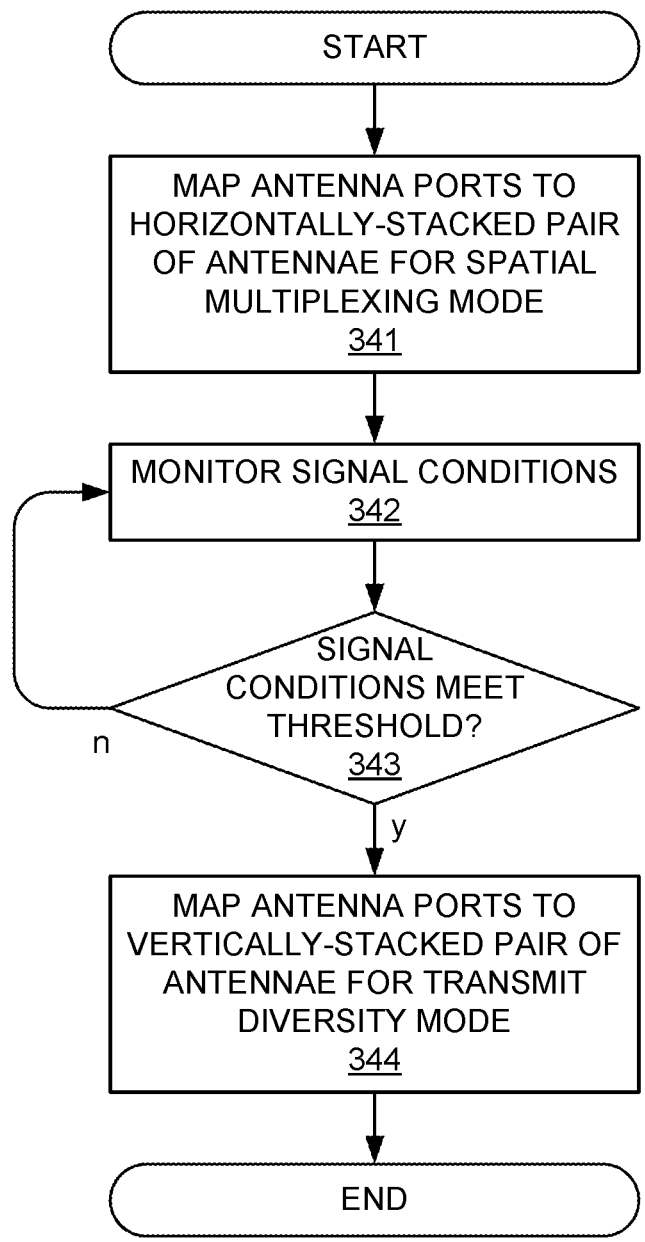
FIG. 3 depicts an exemplary method for dynamic multi-antenna communication.

FIG. 3 depicts an exemplary method for dynamic multi-antenna communication. The method of FIG. 3 is illustrated with respect to an access node 110. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 341, with a plurality of antennae of an access node configured to communicate in a spatial multiplexing mode. Since the spatial multiplexing (transmitting different data streams from each antenna) is generally more efficient than transmit diversity mode (transmitting the same data stream from different antennae), it may be implemented at 341 as a default transmission mode. Configuring antennae further comprises mapping antenna ports to physical antennae. Generally, the term "antenna port" refers to a logical entity versus a physical antenna, and is used to describe signal transmission under identical channel conditions. For example, in an LTE operating mode in the downlink direction for which an independent channel is assumed (e.g. SISO vs. MIMO), a separate logical antenna port is defined. LTE symbols that are transmitted via identical antenna ports are subject to the same channel conditions. In order to determine the characteristic channel for an antenna port, a wireless device must carry out a separate channel estimation for each antenna port. Thus, separate reference signals that are suitable for estimating the respective channel are defined in the LTE standard for each antenna port. See, for example, 3GPP Technical Specification 36.211. In the present embodiment, a horizontally-stacked pair of physical antennae from among at least three physical antennae of the access node may be configured by mapping a first (logical) antenna port to a first physical antenna and a second antenna port to a second physical antenna, thereby forming a first pair of antennae comprising the first and second physical antennae.

At 342, a signal condition is monitored to enable subsequent determination 343 of which transmission mode to implement from among the two transmission modes. The signal condition may be related to a sector served by the antennae of the access node, and may be obtained from wireless devices accessing network services from the access node via one or more of the at least three antennae. The signal condition can comprise a signal to interference plus noise ratio (SINR), or a number or rate of hybrid automatic repeat request (HARQ) retransmissions, or any other metric that provides an indication of coverage requirements of wireless devices at various locations around the network. The signal condition can be an average or other statistical determination based on a majority or all wireless devices, or individual measurements. Further, at 343, the signal condition (i.e. SINR or HARQ rate) can be compared with one or more thresholds in order to trigger a determination of whether or not to switch transmission modes at 344. For example, if the total or average SINR drops to meet a low threshold, then it is determined that the wireless devices served by the at least three antennae may receive better quality of service using a transmit diversity transmission mode. In one exemplary embodiment, a low threshold for SINR is 0 db. Alternatively or in addition, if the total or average HARQ rate or number of retransmissions rises above a high threshold, this also represents a poor reception of wireless devices, and the transmit diversity transmission mode is implemented at 344. In one exemplary embodiment, the high threshold for HARQ retransmission rate is 15%. If neither threshold is met, then the method continues monitoring at 342.

If it is determined at 343 that a threshold is met, then the transmission diversity transmission mode may be implemented at 344 by configuring a vertically-stacked pair of antennae to transmit identical data streams. For example, at least three physical antennae of the access node are arranged such that a first pair of antennae, i.e. first and second antennae, are horizontally-stacked, and a second pair of antennae, i.e. the third antennae and one of the first and second antennae, are vertically-stacked. The vertically-stacked pair may be configured to transmit identical data streams from the third antenna and one of the first and second antennae, i.e. a transmit diversity transmission mode. In one example, mapping antenna ports at 344 includes maintaining the mapping of the first antenna port to the first physical antenna, while the second antenna port may be remapped to the third physical antenna, thereby forming the second pair of antenna comprising the first and third physical antennae. Alternatively, a new (third) antenna port is mapped to the third antenna, and the mapping of the second antenna port to the second antenna is removed, thus forming the second pair of antennae comprising the first and third physical antennae. Other configurations of mapping ports to physical antennae are possible, so long as the first and second pairs are used to respectively communicate using the first and second transmission modes as described herein.

Figure 4:
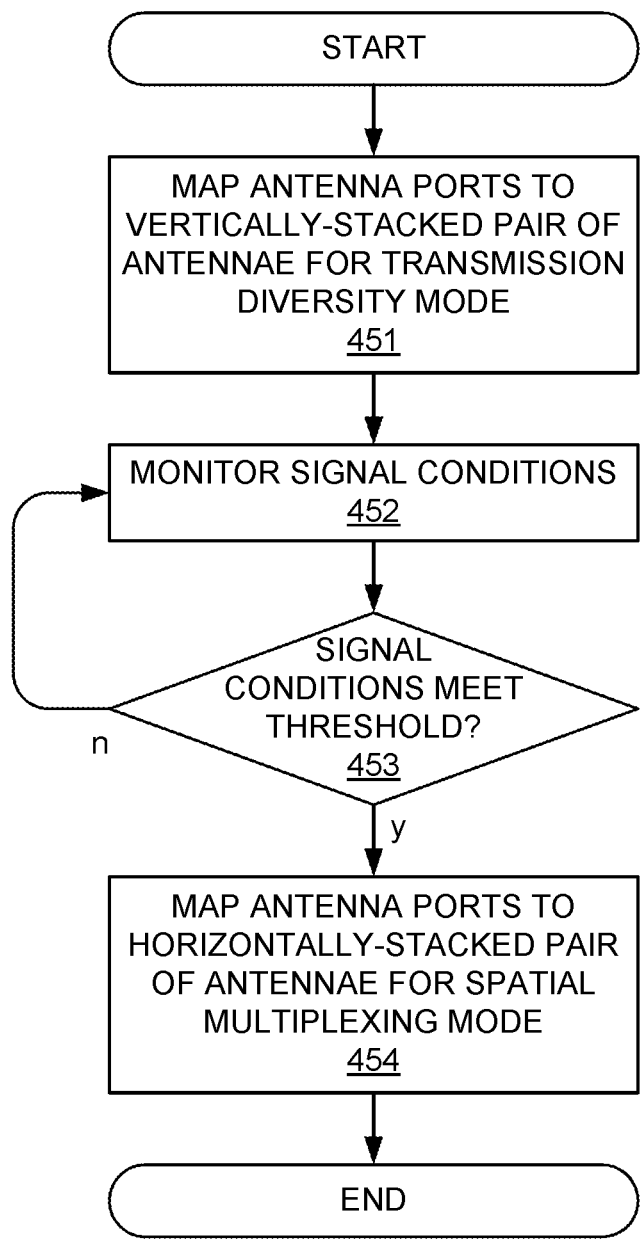
FIG. 4 depicts another exemplary method for dynamic multi-antenna communication.

FIG. 4 depicts another exemplary method for dynamic multi-antenna communication. Similar to the method of FIG. 3, the method of FIG. 4 is illustrated with respect to an access node 110. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 451, with a plurality of antennae of an access node configured to communicate in a transmit diversity transmission mode. Since transmit diversity mode (transmitting the same data stream from different antennae) is generally more reliable than the spatial multiplexing (transmitting different data streams from each antenna), it may be implemented at 451 as a default transmission mode. Configuring antennae further comprises mapping antenna ports to physical antennae, as described herein. For example, at least three physical antennae of the access node are arranged such that a first pair of antennae, i.e. first and second antennae, are horizontally-stacked, and a second pair of antennae, i.e. the third antennae and one of the first and second antennae, are vertically-stacked. The vertically-stacked pair of antennae are configured to transmit identical data streams from, for example, the third antenna and one of the first and second antennae. Thus, mapping antenna ports at 451 includes mapping a first antenna port to a first physical antenna, and mapping a second antenna port to the third physical antenna, thereby forming a first pair of antenna comprising the first and third physical antennae.

At 452, a signal condition is monitored to enable subsequent determination 453 of which transmission mode to implement from among the two transmission modes. The signal condition may be related to a sector served by the antennae of the access node, and may be obtained from wireless devices accessing network services from the access node via one or more of the at least three antennae. The signal condition can comprise a signal to interference plus noise ratio (SINR), or a number or rate of hybrid automatic repeat request (HARQ) retransmissions, or any other metric that provides an indication of coverage requirements of wireless devices at various locations around the network. The signal condition can be an average or other statistical determination based on a majority or all wireless devices, or individual measurements. Further, at 453, the signal condition (i.e. SINR or HARQ rate) can be compared with one or more thresholds in order to trigger a determination of whether or not to switch transmission modes at 454. For example, if the total or average SINR rises to meet a high threshold, then it is determined that a more efficient usage of resources may be achieved by using a spatial multiplexing transmission mode. In one exemplary embodiment, a high threshold for SINR is 0 db. Alternatively or in addition, if the total or average HARQ rate or number of retransmissions falls to meet a low threshold, this also represents a satisfactory quality of service for wireless devices, and the spatial multiplexing transmission mode is implemented at 454. In one exemplary embodiment, the low threshold for HARQ retransmission rate is 15%. If neither threshold is met, then the method continues monitoring at 452.

If it is determined at 453 that a threshold is met, then the spatial multiplexing transmission mode may be implemented at 454 by configuring the horizontally-stacked pair of physical antennae (i.e. first and second antennae) to transmit different streams using spatial multiplexing. In an exemplary embodiment, this includes maintaining the mapping of the first antenna port to the first physical antenna, and mapping (or remapping) the second antenna port to the second physical antenna, thereby forming a second pair of antennae comprising the first and second physical antennae. Alternatively, a new (third) antenna port is mapped to the second antenna, and the mapping of the second antenna port to the third antenna is removed, thus forming the second pair of antennae comprising the first and second physical antennae. Other configurations of mapping ports to physical antennae are possible.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to access nodes 110, 210, controller node 107, and/or network 101.

Figure 5:
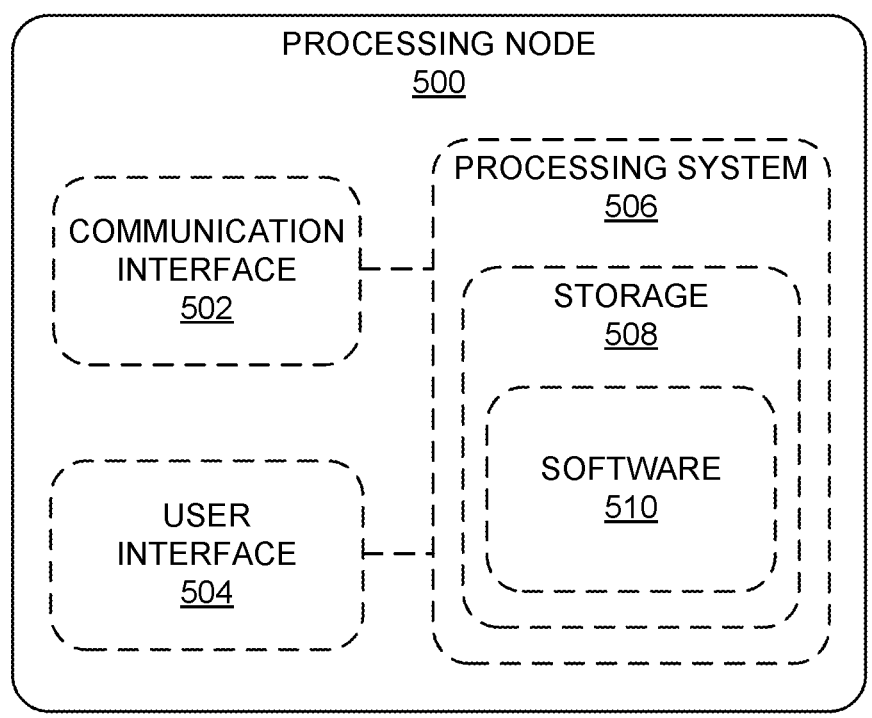
FIG. 5 depicts an exemplary processing node dynamic multi-antenna communication.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a transmission mode determination module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating via a plurality of antennae, the method comprising:
   in a first transmission mode, transmitting different data streams from each of a first antenna and a second antenna;
   in a second transmission mode, transmitting identical data streams from a third antenna and one of the first and second antennae; and
   determining, based on a signal condition of a sector served by the first, second, and third antennae, which one of the first and second transmission modes to use,
   wherein the first and second antennae are horizontally stacked relative to each other and the third antenna is vertically stacked relative to both the first and second antennae.

2. The method of claim 1, wherein the first transmission mode utilizes spatial multiplexing, and wherein the second transmission mode utilizes transmit diversity.

3. The method of claim 1, wherein the signal condition comprises an average signal to interference plus noise ratio (SINK).

4. The method of claim 3, further comprising determining that the average SINR is above a threshold, and using the first transmission mode.

5. The method of claim 1, wherein the signal condition comprises an average rate of hybrid automatic repeat request (HARQ) retransmissions.

6. The method of claim 5, further comprising determining that the average rate of HARQ transmissions is below a threshold, and using the first transmission mode.

7. A system for communicating via a plurality of antennae,
   the system comprising:
   a first antenna;
   a second antenna positioned horizontally adjacent the first antenna;
   a third antenna positioned vertically adjacent both the first and second antennae; and
   a processing node communicatively coupled to each of the first, second, and third antennae, the processing node being configured to determine a transmission mode from among:
   a spatial multiplexing mode using the first and second antennae; and
   a transmit diversity mode using the third antenna and one of the first and second antennae,
   wherein the processing node is configured to determine the transmission mode based on a signal condition of a sector served by the first, second, and third antennae.

8. The system of claim 7, wherein the signal condition comprises an average signal to interference plus noise ratio (SINK).

9. The system of claim 8, further comprising determining that the average SINR falls to meet a threshold, and using the second transmission mode.

10. The system of claim 7, wherein the signal condition comprises an average rate of hybrid automatic repeat request (HARQ) retransmissions.

11. The system of claim 10, further comprising determining that the average rate of HARQ transmissions rises to meet a threshold, and using the first transmission mode.

12. The system of claim 7, wherein a horizontal distance between the first and second antennae is less than or equal to half of an average wavelength of signals transmitted by either of the first and second antennae.

13. The system of claim 12, wherein each of the first and second antennae further comprise a dual-band antenna, and wherein the horizontal distance is less than or equal to half of a smallest wavelength transmitted by each dual-band antenna.

14. The system of claim 7, wherein at least one of the first, second, and third antennae further comprise a dual-band antenna.

15. A processing node for communicating via a plurality of antennae, the processing node being configured to perform operations comprising:

utilizing a first pair of antennae in a spatial multiplexing transmission mode, wherein the first pair of antennae is horizontally-stacked; and upon a signal condition meeting a threshold, utilizing a second pair of antennae in a transmit diversity transmission mode, wherein the second pair of antennae is vertically-stacked;

wherein both first and second pairs have one antenna in common.

16. The processing node of claim 15, wherein the operations further comprise mapping an antenna port to at least two antennas out of the first and second pair of antennae in each transmission mode.

17. The processing node of claim 16 wherein, in the spatial multiplexing transmission mode, the operations further comprise mapping a first antenna port to a first antenna in the first pair, and a second antenna port to a second antenna in the first pair.

18. The processing node of claim 17 wherein, in the transmit diversity transmission mode, the operations further comprise remapping the second antenna port to a third antenna in the second pair of antennae.

* * * * *